United States Patent [19]
Trudell

[11] 3,713,625
[45] Jan. 30, 1973

[54] CHAIN LINK FENCE LIFT

[76] Inventor: A. R. Trudell, 7173 Quincy Lane, Clearwater, Fla. 33516

[22] Filed: Dec. 30, 1970

[21] Appl. No.: 102,806

[52] U.S. Cl. ............................256/32, 256/34
[51] Int. Cl. .........................................E04h 17/14
[58] Field of Search.......256/32, 12.5, 13, 24, 34, 33; 49/10, 11, 12

[56] References Cited

UNITED STATES PATENTS

| | | | |
|---|---|---|---|
| 1,293,335 | 2/1919 | Chambliss | 256/24 |
| 309,794 | 12/1884 | Offill et al. | 49/10 |
| 328,897 | 10/1885 | Lovelace | 49/10 |
| 1,160,728 | 11/1915 | Liggett | 256/24 |
| 2,814,466 | 11/1957 | Golobay | 256/32 |

*Primary Examiner*—Dennis L. Taylor

[57] ABSTRACT

A section of fence which will have the lower portion of such construction so as to be raised or lowered in order to effectively use a lawnmower on the grass adjacent to the fence. This device includes upright members to which the upper portion of the fence is secured and also offsets the need for elevating or lowering the bottom portion of the fence.

3 Claims, 7 Drawing Figures

PATENTED JAN 30 1973

INVENTOR.

A. R. TRUDELL

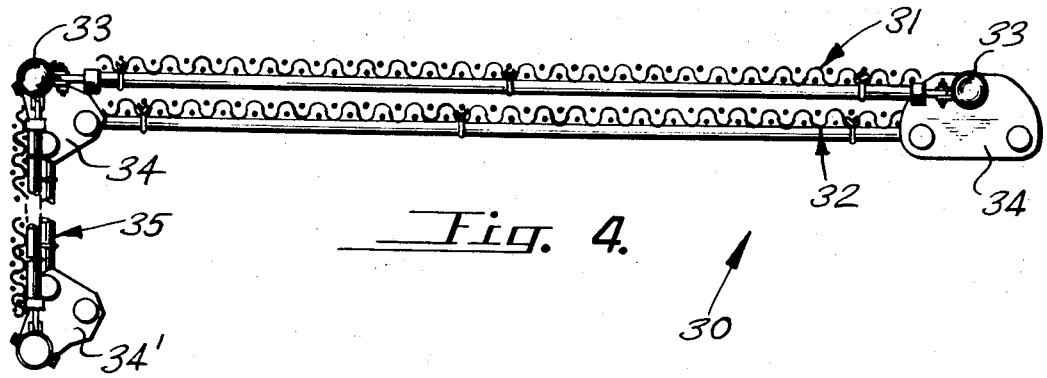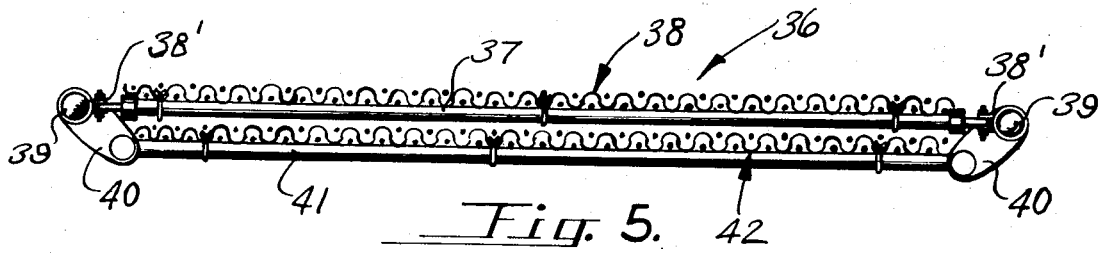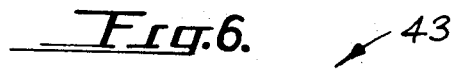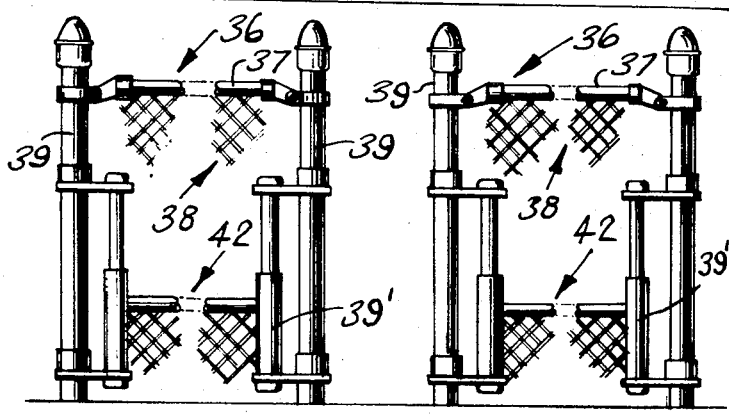

CHAIN LINK FENCE LIFT

This invention relates to fence structures, and more particularly to a chain lift fence or the like.

It is therefore the primary purpose of this invention to provide a chain lift fence which will have a bottom portion which may be easily raised in order to effectively use a lawn mower by allowing the lawn mover passageway near the portion of the fence.

Another object of this invention is to provide a fence of the type described which has members that will be received or carried, having rod members at each end to which the wire mesh is fastened and to the post members of a section of the fence will be attached plates having telescoping members for raising the lower portion of the fence.

A further object of this invention is to provide a fence of the type described which will have a telescoping horizontal member which will have attached thereto, the wire mesh forming the bottom portion of the fence.

Other objects of this invention are to provide a chain lift fence which is simple in design, inexpensive to manufacture, rugged in construction, easy to use and efficient in operation.

These and other objects will become readily evident upon a study of the following specification together with the accompanying drawing wherein:

FIG. 4 is a fragmentary top plan view showing a modified form of the invention as associated with a fence corner;

FIG. 5 is a top plan view showing another modified form of the fence section;

FIG. 6 is a top plan view shown in fragmentation a pair of spaced apart fence sections which define a walk-way; and FIG. 7 is a front view of the devices shown in Figure 6 of the drawings.

Figure 1:
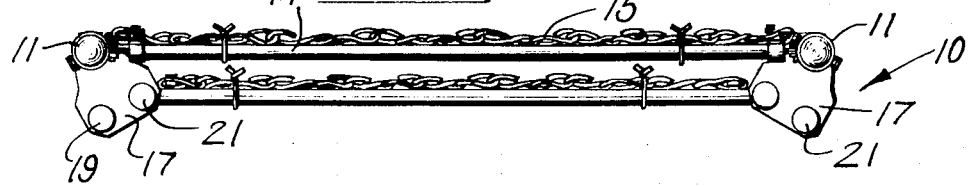
FIG. 1 is a top plan view of the present invention.
Figure 2:
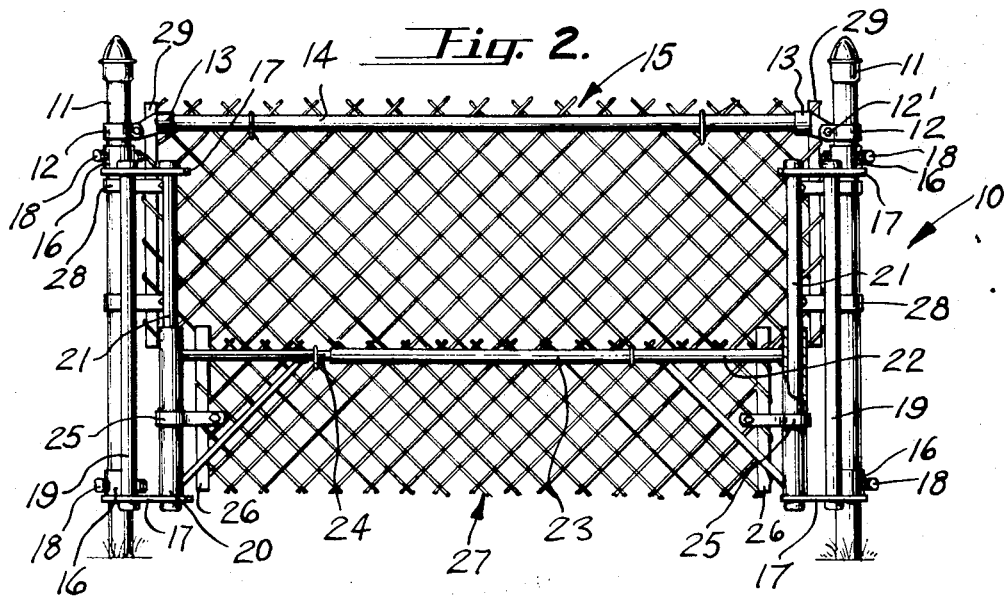
FIG. 2 is a front view of the invention.
Figure 3:
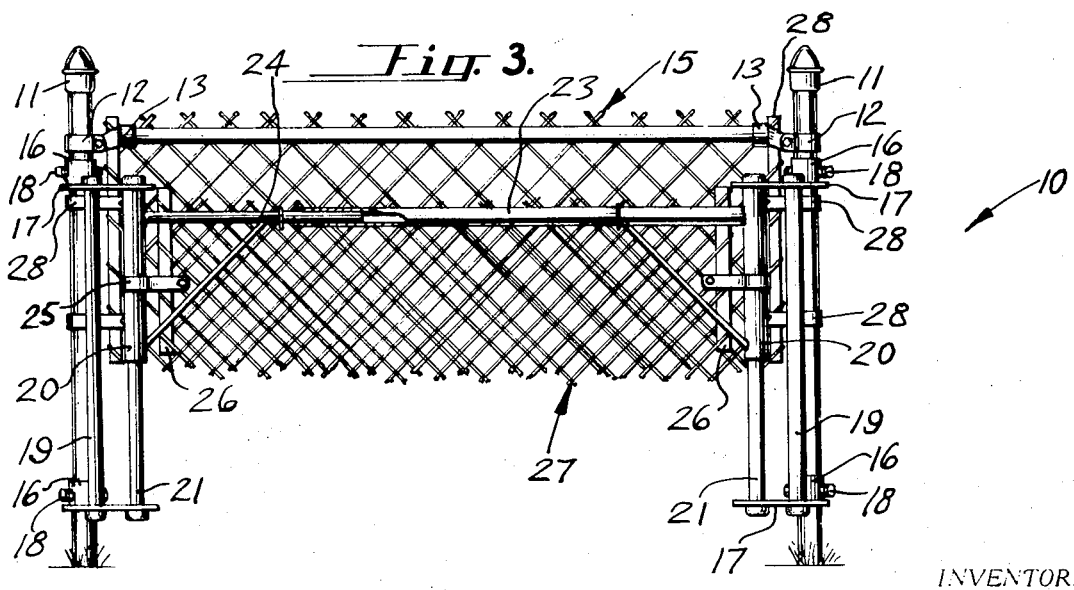
FIG. 3 is similar to FIG. 2, but showing the lower portion in its raised position.

According to this invention, a chain lift fence 10 is provided with a pair of parallel spaced apart post members 11 and a collar 12 secured thereto by means of a bolt fastener 12' which also secures a bracket 13 which carries a horizontal tube 14 which supports the upper wire mesh 15. A collar 16 having a plate 17 welded therethrough, is held onto each of the posts 11 by means of a set screw 18.

It will be noted that each of the posts 11 is provided with a pair of spaced apart collar 16 and their associated plates 17 which are offset thereof to support a tube or rod 19 which is spaced apart from the posts 11. The tube or rod 19 is fixedly secured to plates 17 by welding or other suitable means. A sleeve 20 is secured fixedly by welding or other means, to the bottom most plates 17 and telescoping receives a tube or rod 21 which is secured at its upper extremity to the uppermost plates 17. The horizontal sleeve 22 secured to one of the tube or rods 21 and telescopingly receives a central sleeve 23 which slidably receives rod 24 which is secured at one end to the opposite sleeve 20 of fence 10. Sleeves 20 carry a clamp member 25 which is secured to a bar member 26 which holds the lower wire mesh 27.

It shall also be noted that a pair of clamps 28 upon the post 11 are secured to rods 29 which aid in supporting the wire mesh 15.

When the owner or other person wishes to use the lawn mower against fence 10, the lower portion is raised by lifting upon the horizontal member comprising sleeve 22, sleeve 23 and rod 24, the resulting action causes sleeve 20 to slide upwards upon the rods 21 thus leaving an opening of sufficient height so that the lawn mower may be passed under fence 10.

Looking now at FIG. 4 of the drawings, one will see a modified form of fence 30 which includes the upper fence 31 and the lower fence portion 32, the lower fence 32 being the one that is raised in a manner heretofore described in the main embodiment of the invention. Fence 30 is shown to include plates 34 and the arrangement shown in FIG. 4 illustrates a corner section of fence and therefore on the adjacent leg thereof, is positioned an adjustable lower portion 35 which are placed in a similar manner as heretofore described.

Looking now more particularly to FIG. 5 of the drawing, one will see another modified form 35 having an upper rod 37 to which is attached the upper wire mesh 38. The clamp member 38' is secured in the well known manner to the post members 39 which carry the plates 40 to which is attached a horizontal rod 41 which supports the lower wire mesh 42.

Looking now at FIGS. 6 and 7 of the drawing, one will see a modified arrangement 43 which includes a pair of spaced apart fence sections having an upper bar or tube member 37 to which is suitably attached a wire mesh 38 and a slideable sleeve 39' are utilized in the same aforementioned fashion as described in the other embodiments, the lower fence portion 42 being raisable when desired and the two fence sections 36 are spaced apart so as to form a walk-way.

What I now claim is:

1. A chain lift fence comprising a pair of parallel post members, an upper fixed fence portion and a lower adjustable fence portion carried by said posts, the upper extremities of said posts including clamp members secured to brackets for supporting an upper horizontal member therebetween said brackets having downwardly extending rod members which act in conjunction with said upper horizontal member to hold the wire mesh of said upper fixed fence portion of said device, a pair of collars with attached plates carried by said posts, said collars of said posts being spaced apart and secured thereto by set screw means said plates of said collars being offset thereof to support a rod which is spaced apart from said posts and a sleeve and rod combination comprising telescoping members, whereby said lower adjustable fence portion is adjustable vertically relative to said upper fixed fence portion.

2. The chain lift fence of claim 1 wherein said rods of said sleeve and rod combinations fixedly secured to said plates upon said post and said rod and its associated sleeve is parallel with said rod adjacent thereto and defines an offset position for the lower fence portion to be raised and lowered.

3. The chain lift fence of claim 2 wherein said sleeve is slidably mounted on said rod, and said fence further including a second clamp member attached to said sleeve, said second clamp member being secured to a length of rod which is parallel to said sleeve, and a second horizontal member attached to said sleeve said length of rod in combination with said telescoping and horizontal members comprising support means for the lower wire mesh portion of said lower adjustable fence portion such that when said sleeves are raised relative to said upper fixed fence portion said lower adjustable fence portion is moved upwards so as to allow clearance for the passage of a lawnmower or other device.

* * * * *